(12) United States Patent
Melkonian et al.

(10) Patent No.: US 12,168,600 B1
(45) Date of Patent: Dec. 17, 2024

(54) VARIABLE TEMPERATURE CONTROL ASSEMBLY FOR A WATER DISPENSER

(71) Applicant: Brio Water Technology, Inc., City of Industry, CA (US)

(72) Inventors: Arman Melkonian, La Cañada Flintridge, CA (US); Mark Melkonian, Northridge, CA (US); Ravi Sawhney, Malibu, CA (US); Craig Steele, Manhattan Beach, CA (US); Samaykumar Patel, Santa Clarita, CA (US); Michael Kulick, Simi Valley, CA (US)

(73) Assignee: Brio Water Technology, Inc., City of Industry, CA (US)

( * ) Notice: Subject to any disclaimer, the term of this patent is extended or adjusted under 35 U.S.C. 154(b) by 0 days.

(21) Appl. No.: 18/581,130

(22) Filed: Feb. 19, 2024

(51) Int. Cl.
  *B67D 7/00* (2010.01)
  *B67D 1/00* (2006.01)
  *B67D 1/12* (2006.01)

(52) U.S. Cl.
  CPC ......... *B67D 1/1204* (2013.01); *B67D 1/0014* (2013.01); *B67D 2001/1263* (2013.01); *B67D 2210/00118* (2013.01)

(58) Field of Classification Search
  CPC ................ B67D 1/1204; B67D 1/0014; B67D 2001/1263; B67D 2210/00118
  See application file for complete search history.

(56) References Cited

U.S. PATENT DOCUMENTS

| | | | |
|---|---|---|---|
| 3,721,386 A | 3/1973 | Brick et al. | |
| 8,083,104 B2 | 12/2011 | Roetker et al. | |
| 8,276,787 B1 * | 10/2012 | Gremillion | B67D 1/0004 222/64 |
| 8,636,174 B1 | 1/2014 | Motkowski et al. | |
| 10,466,725 B2 | 11/2019 | Tang | |
| 10,974,944 B2 | 4/2021 | Lee et al. | |
| 11,274,028 B2 | 3/2022 | Defazio et al. | |
| 2006/0115570 A1 * | 6/2006 | Guerrero | B67D 1/0027 426/590 |
| 2008/0115672 A1 * | 5/2008 | Jones | A47J 31/401 99/275 |
| 2010/0006658 A1 | 1/2010 | Peteri et al. | |
| 2012/0138632 A1 * | 6/2012 | Li | A47J 31/56 222/64 |
| 2014/0208955 A1 | 7/2014 | Yui | |
| 2018/0188751 A1 | 7/2018 | Tang | |
| 2018/0303283 A1 | 10/2018 | Kollep et al. | |
| 2020/0216331 A1 * | 7/2020 | Jeon | C02F 1/325 |

(Continued)

FOREIGN PATENT DOCUMENTS

| | | | |
|---|---|---|---|
| CN | 103948313 B | | 8/2016 |
| CN | 106225313 A | * | 12/2016 |
| CN | 205947664 U | | 2/2017 |

(Continued)

*Primary Examiner* — Bob Zadeh

(74) *Attorney, Agent, or Firm* — Foundation Law Group LLP

(57) ABSTRACT

A variable temperature control assembly for a water dispenser, using a variable water temperature selector, that delivers water to the consumer at the temperature requested on the variable temperature selector by calculating the required ratio of hot water, cold water and ambient water needed to deliver water at the temperature requested.

11 Claims, 8 Drawing Sheets

(56) References Cited

U.S. PATENT DOCUMENTS

2021/0284522 A1   9/2021   Urech

FOREIGN PATENT DOCUMENTS

| | | | | | |
|---|---|---|---|---|---|
| CN | 112703168 | A | * | 4/2021 | ............ A47J 31/402 |
| EP | 3210933 | A1 | | 8/2017 | |
| KR | 20170016193 | A | * | 2/2017 | |
| WO | 2017161603 | A1 | | 9/2017 | |

* cited by examiner

VARIABLE TEMPERATURE CONTROL ASSEMBLY FOR A WATER DISPENSER

BACKGROUND

Currently, when a user requests a specific water temperature for his dispensed water, it is often frustrating because the water dispensed is not the temperature requested. To attempt to achieve a requested water temperature, most current water dispensers mix fixed ratios of hot, cold or ambient temperature water from tanks, but the fixed ratios may not create the exact temperature requested because the water temperature in one or all of the tanks may have varied for a number of reasons. This method essentially amounts to guessing and hoping the water dispensed is not too far off from what the dispenser user is expecting and is "good enough".

Some systems have tried to address this issue by variably mixing hot and cold water on-the-fly at the time of the user's requests. These systems mix the hot and cold water at the time of dispensing and have a sensor to measure the temperature of the mixed water at the dispensing point. By doing this, these systems create a feedback loop and adjust the temperature of the dispensed water by adjusting the hot and cold mixing ratio to try to get the water to the temperature requested. These systems also, usually, come up short. The time between mixing and dispensing is so short that the feedback loop usually has a lag, and the on-the-fly variable mixing can have a wide temperature range between selectable temperatures. As a result, the user typically selects between a set of limited buttons that provide for approximate pre-programmed temperatures when depressed. These systems are not capable of providing the precise water temperature that the user desires. These trial-and-error type approaches also have the potential of wasting water.

Accordingly, there is a need for a water dispenser that allows a user to select almost any dispensing water temperature, and the dispenser is capable of providing water, in real-time, at the temperature, or very near the temperature, requested.

SUMMARY

According to one aspect of the present invention, a variable temperature control assembly for use in a water dispenser includes a variable temperature selector; a hot water system, which includes a hot water tank and a hot water solenoid, where the hot water solenoid is in communication with the hot water tank; a cold water system, which includes a cold water tank and a cold water solenoid, where the cold water solenoid is in communication with the hot water tank; and a processor, in communication with the variable temperature selector, the hot water solenoid and the cold water solenoid, capable of determining the ratio of hot water and cold water required to deliver water at a temperature selected on the variable temperature selector. When a user selects a temperature to dispense water at on the variable temperature selector and based on the input received from the variable temperature selector, the processor determines the temperature of water in the hot water tank and the temperature of the water in the cold water tank and using the determined temperatures of the water in the hot water tank and the water in the cold water tank, calculates the ratio of hot water and cold water required to deliver water at the temperature selected on the variable temperature selector and sends a signal to each of the hot water solenoid and the cold water solenoid to dispense water at the determined ratio.

According to another aspect of the present invention, a variable temperature control assembly for use in a water dispenser, includes a variable temperature selector; a hot water system, which includes a hot water tank and a hot water solenoid, where the hot water solenoid is in communication with the hot water tank; a cold water system, which includes a cold water tank and a cold water solenoid, where the cold water solenoid is in communication with the hot water tank; an ambient water system, which includes an ambient water tank and an ambient water solenoid, where the ambient water solenoid is in communication with the ambient water tank; a processor, in communication with the variable temperature selector, the hot water solenoid, the cold water solenoid and the ambient water solenoid, capable of determining the ratio of hot water, cold water and ambient water required to deliver water at a temperature selected on the variable temperature selector; and a mixing chamber in fluid communication with the hot water solenoid, the cold water solenoid and the ambient water solenoid. When a user selects a temperature to dispense water at on the variable temperature selector and based on the input received from the variable temperature selector, the processor determines the temperature of water in the hot water tank, the temperature of the water in the cold water tank and the temperature of the water in the ambient water tank and using the determined temperatures of the water in the hot water tank, the water in the cold water tank and the water in the ambient water tank, calculates the ratio of hot water, cold water and ambient water required to deliver water at the temperature selected on the variable temperature selector and sends a simultaneous one-time signal to each of the hot water solenoid, the cold water solenoid and the ambient water solenoid to release water into the mixing chamber at the determined ratio in order to dispense water at the selected temperature.

According to yet another aspect of the present invention, a method for delivering water at a specific requested temperature in a water dispenser includes the steps of providing a variable temperature control assembly, having a variable temperature selector; a hot water system, having a hot water tank and a hot water solenoid, where the hot water solenoid is in communication with the hot water tank; a cold water system, having a cold water tank and a cold water solenoid, where the cold water solenoid is in communication with the cold water tank; a processor, in communication with the variable temperature selector, the hot water solenoid and the cold water solenoid capable of determining the ratio of hot water and cold water required to deliver water at a temperature selected on the variable temperature selector; selecting a temperature to dispense water at on the variable temperature selector; sending a signal to the processor based on the requested water temperature input received from the variable temperature selector; determining the temperature of water in the hot water tank and the temperature of the water in the cold water tank; calculating the ratio of hot water and cold water required to deliver water at the requested water temperature using the determined temperatures of the water in the hot water tank and the water in the cold water tank; simultaneously sending a one-time signal to each of the hot water solenoid and the cold water solenoid to dispense water at the determined ratio; and dispensing water at the requested water temperature.

DRAWINGS

Objects, features, and advantages of the present invention will become apparent upon reading the following description in conjunction with the drawing figures, in which.

DESCRIPTION

Figure 1:
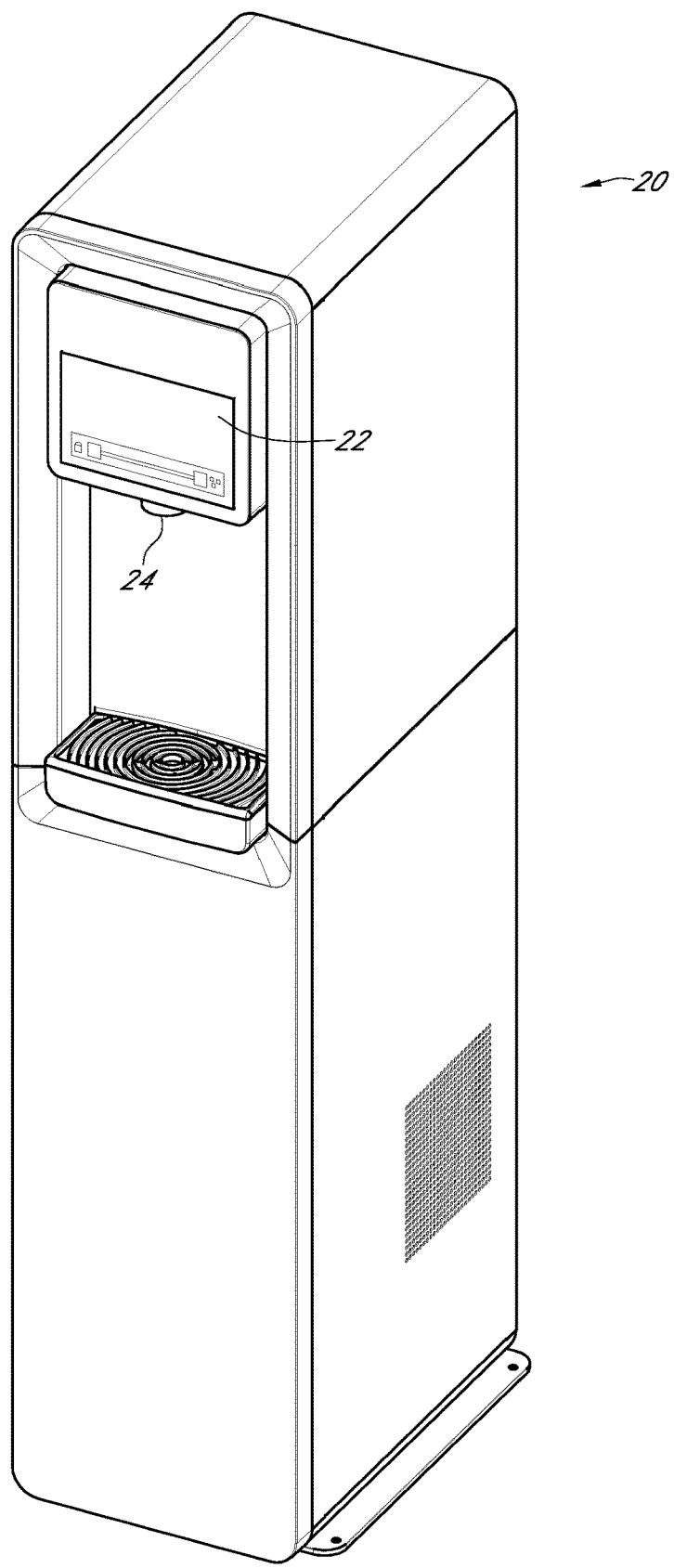
FIG. 1 is a front perspective view of a water dispenser utilizing an embodiment of a variable temperature control assembly of the present invention.
Figure 2:
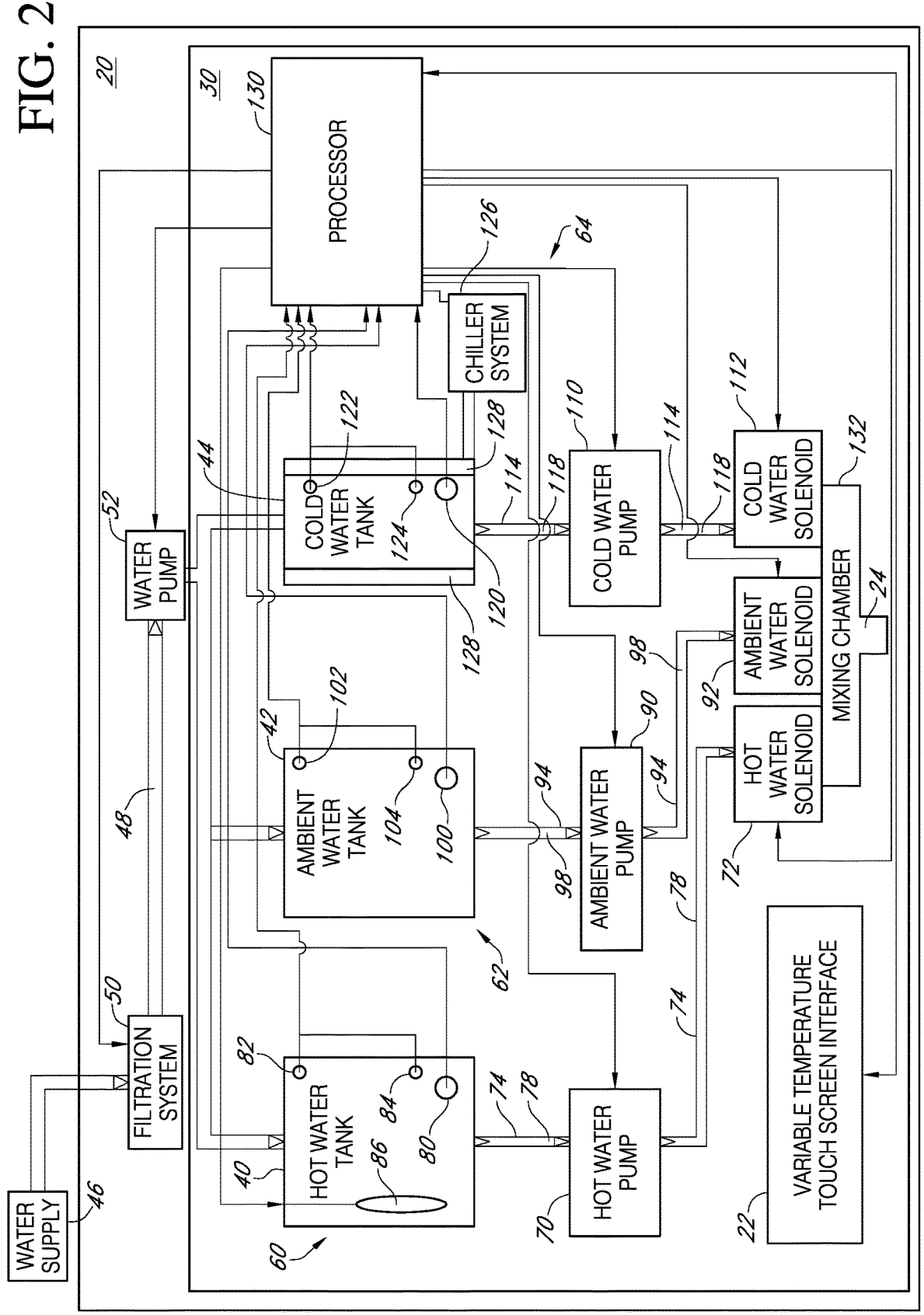
FIG. 2 illustrates a functional block diagram an embodiment of a variable temperature control assembly of the present invention disposed in a water dispenser.

Referring to FIGS. 1-2, an exemplary water dispenser 20 utilizing an embodiment of a variable temperature control assembly 30 of the present invention is depicted. In this exemplary water dispenser 20, the water dispenser 20 has, among other things, a user interface 22, for the user to select what temperature is desired and to dispense water, and a water dispensing nozzle 24. Referring now to FIG. 2, a functional block diagram of an embodiment of the variable temperature control assembly 30 of the present invention, housed in the water dispenser 20, is depicted. The variable temperature control assembly 30 in this embodiment includes three water tanks: a hot water tank 40, an ambient water tank 42 and a cold water tank 44. The variable temperature control assembly 30 includes three tanks in this embodiment, but it should be understood that the variable temperature control assembly 30 of the present invention could include any number of water tanks, and the tanks could be any combination of temperatures of tanks (e.g. two hot and two cold or one hot and one cold with no ambient, etc.). Each water tank 40, 42, 44 connects to a water supply 46 for the water dispenser 20, such as a tap water source, that supplies water 48 to the water tanks 40, 42, 44. Also, in this embodiment, the water 48 from the water supply 46 goes through a filtration system 50 before a water pump 52 pumps the water 48 to the water tanks 40, 42, 44.

The variable temperature control assembly 30, in this embodiment, includes a hot water system 60, an ambient water system 62 and a cold water system 64. The hot water system 60 includes the hot water tank 40, a hot water pump 70, a hot water variable solenoid 72 and piping 74 that connects the hot water tank 40, the hot water pump 70 and the hot water variable solenoid 72 and carries hot water 78 between these components. Disposed within the hot water tank 40, in this embodiment, are a hot water temperature sensor 80, a high water level sensor 82, a low water level sensor 84 and a heating coil 86. The ambient water system 62 includes the ambient water tank 42, an ambient water pump 90, an ambient water variable solenoid 92 and piping 94 that connects the ambient water tank 42, the ambient water pump 90 and the ambient water variable solenoid 92 and carries ambient water 98 between these components. Disposed within the ambient water tank 42, in this embodiment, are an ambient water temperature sensor 100, a high water level sensor 102, a low water level sensor 104. Further, the cold water system 64 includes the cold water tank 44, a cold water pump 110, a cold water variable solenoid 112 and piping 114 that connects the cold water tank 44, the cold water pump 110 and the cold water variable solenoid 112 and carries cold water 118 between these components. Disposed within the cold water tank 44, in this embodiment, are a cold water temperature sensor 120, a high water level sensor 122, a low water level sensor 124. The cold water system 64 further includes a chiller system 126 that connects with chiller coils 128 that are disposed outside of the cold water tank 44. The chiller system 126 chills a refrigerant that circulates through the chiller coils 128 to chill the water 48 in the cold water tank 44. It should be understood that any method or system to chill water 48 in the cold water tank 44 may be employed.

The variable temperature control assembly 30 of this embodiment of the present invention further includes a processor 130 which receives input signals from and sends output signals to the components of the water dispenser 20 (e.g. user interface 22; water pump 52; filtration system 50; chiller system 126; chiller coils 128; heating coil 86; hot water temperature sensor 80; ambient water temperature sensor 100; cold water temperature sensor 120; high water level sensors 82, 102, 122; low water level sensors 84, 104, 124; cold water pump 110; hot water pump 70; ambient water pump 90; cold water variable solenoid 112, hot water variable solenoid 72 and ambient water variable solenoid 92). The processor 130 further has other functions, including storing data; making computations and issuing component commands to allow the variable temperature control assembly 30 to function and, generally, to keep the water dispenser 20 operating.

Figure 3:
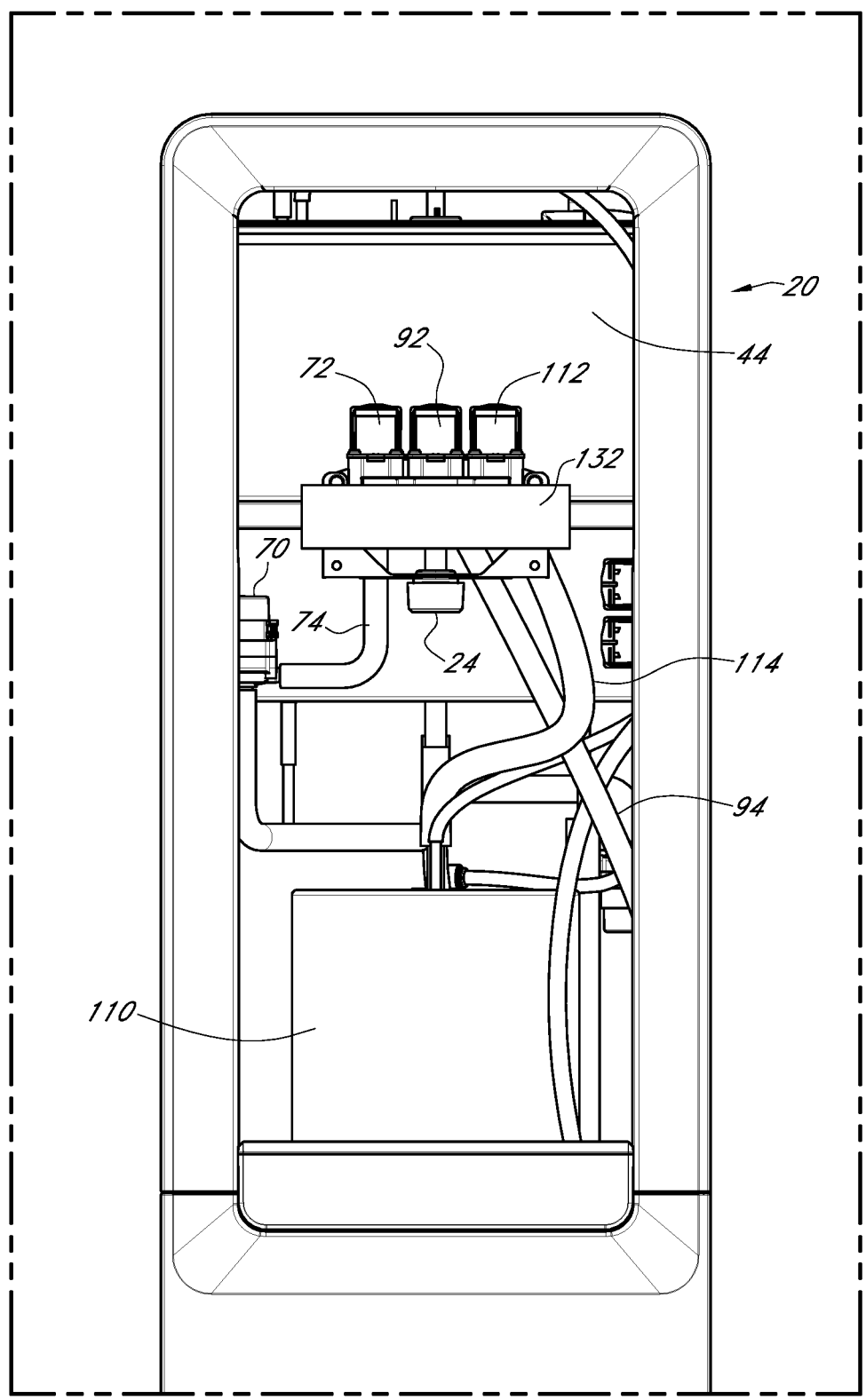
FIG. 3 is a partial front view of a water dispenser utilizing an embodiment of a variable temperature control assembly of the present invention showing the interior components of the water dispenser.
Figure 4:
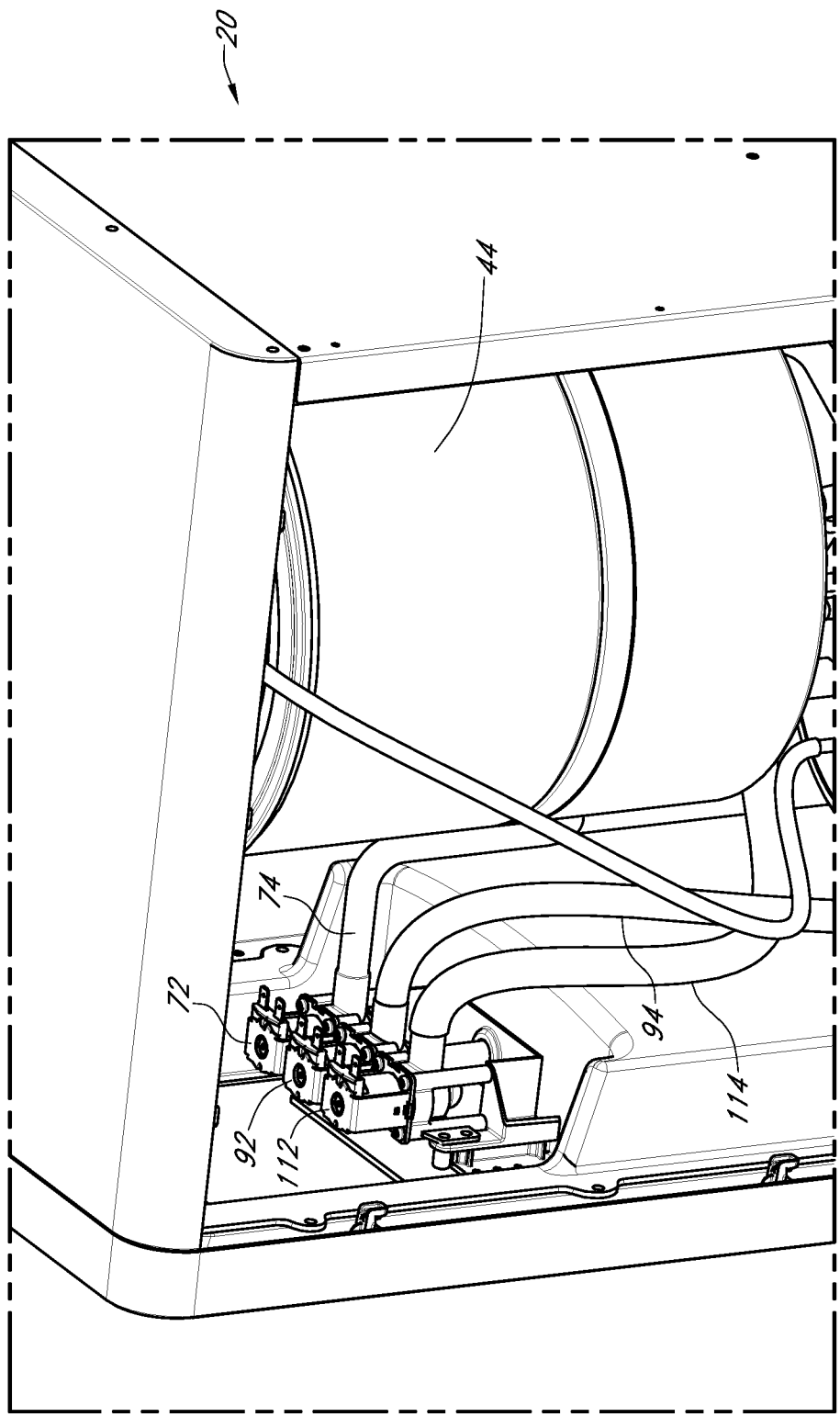
FIG. 4 is a partial right side view of a water dispenser utilizing an embodiment of a variable temperature control assembly of the present invention showing some of the interior components of the water dispenser.
Figure 5:
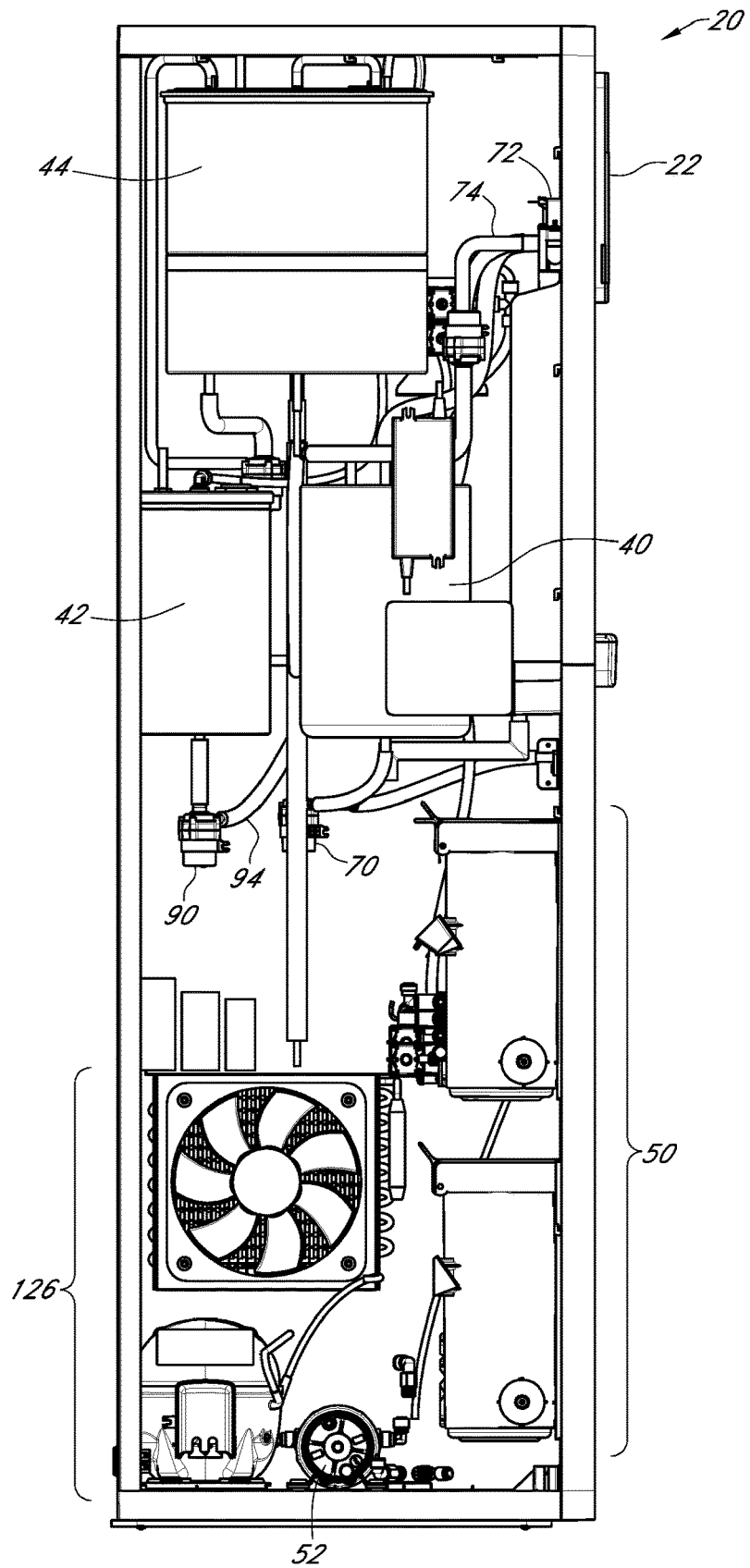
FIG. 5 is a left side view of a water dispenser utilizing an embodiment of a variable temperature control assembly of the present invention showing the interior components of the water dispenser.
Figure 6:
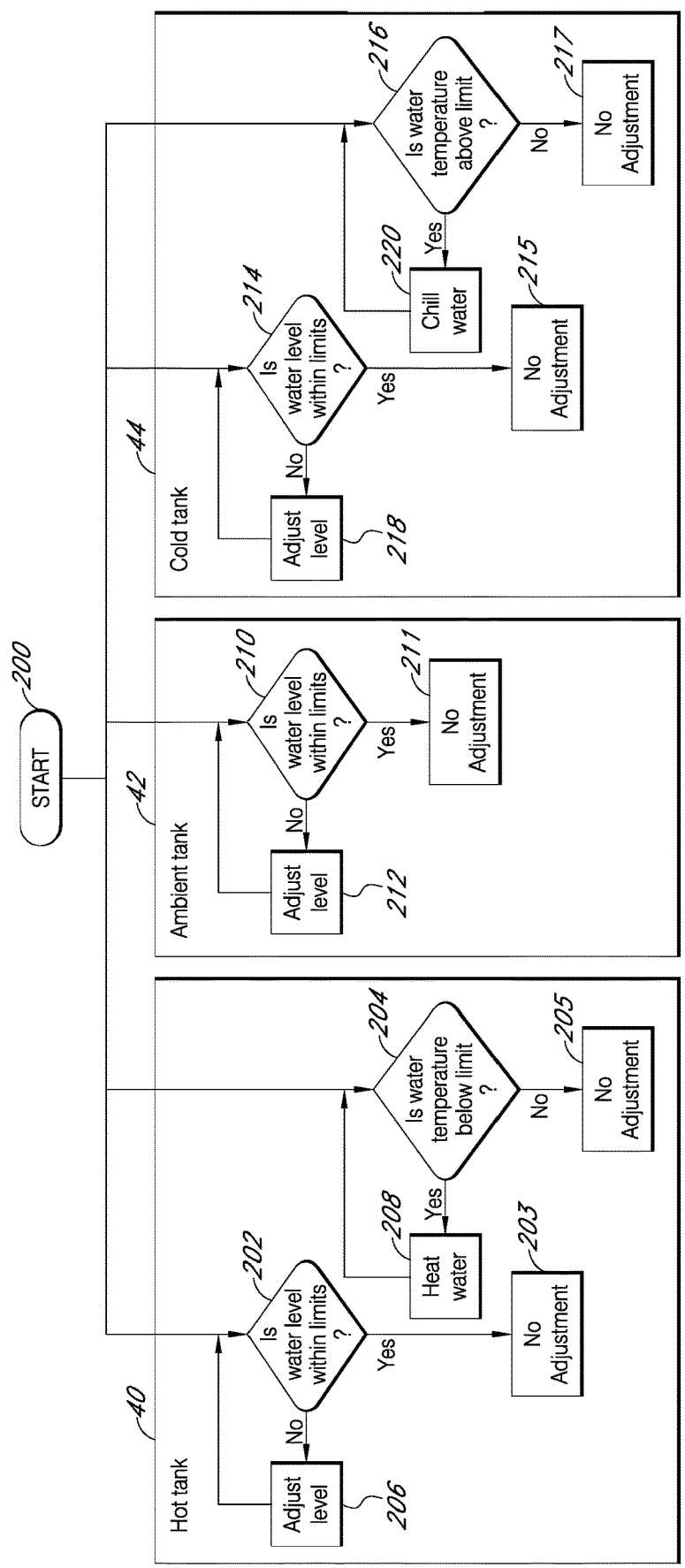
FIG. 6 is a flowchart illustrating an embodiment of a process of the present invention to maintain water in a state ready to dispense water.
Figure 7:
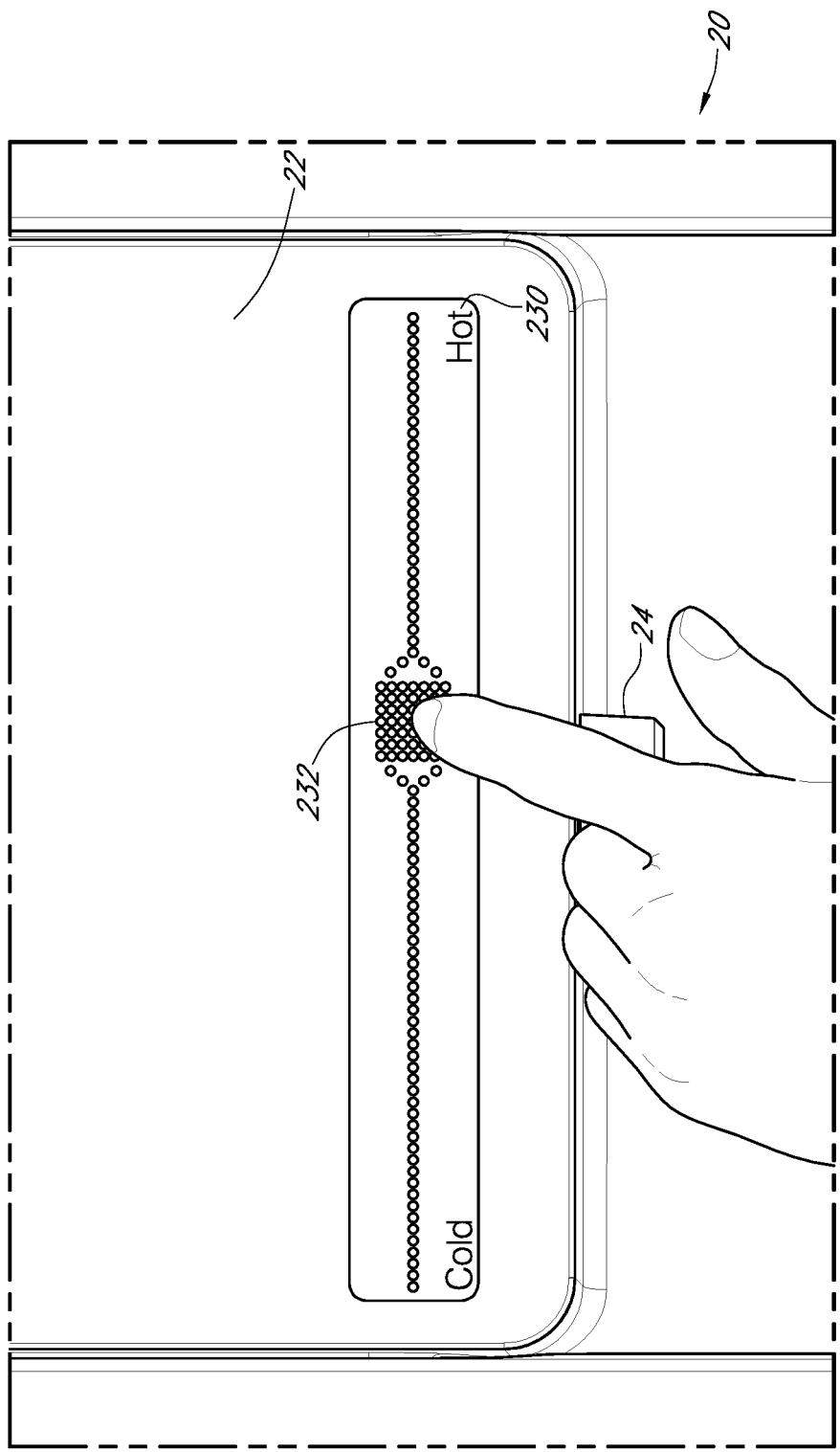
FIG. 7 depicts a capacitive touch temperature slider used in an embodiment of a variable temperature control assembly of the present invention.
Figure 8:
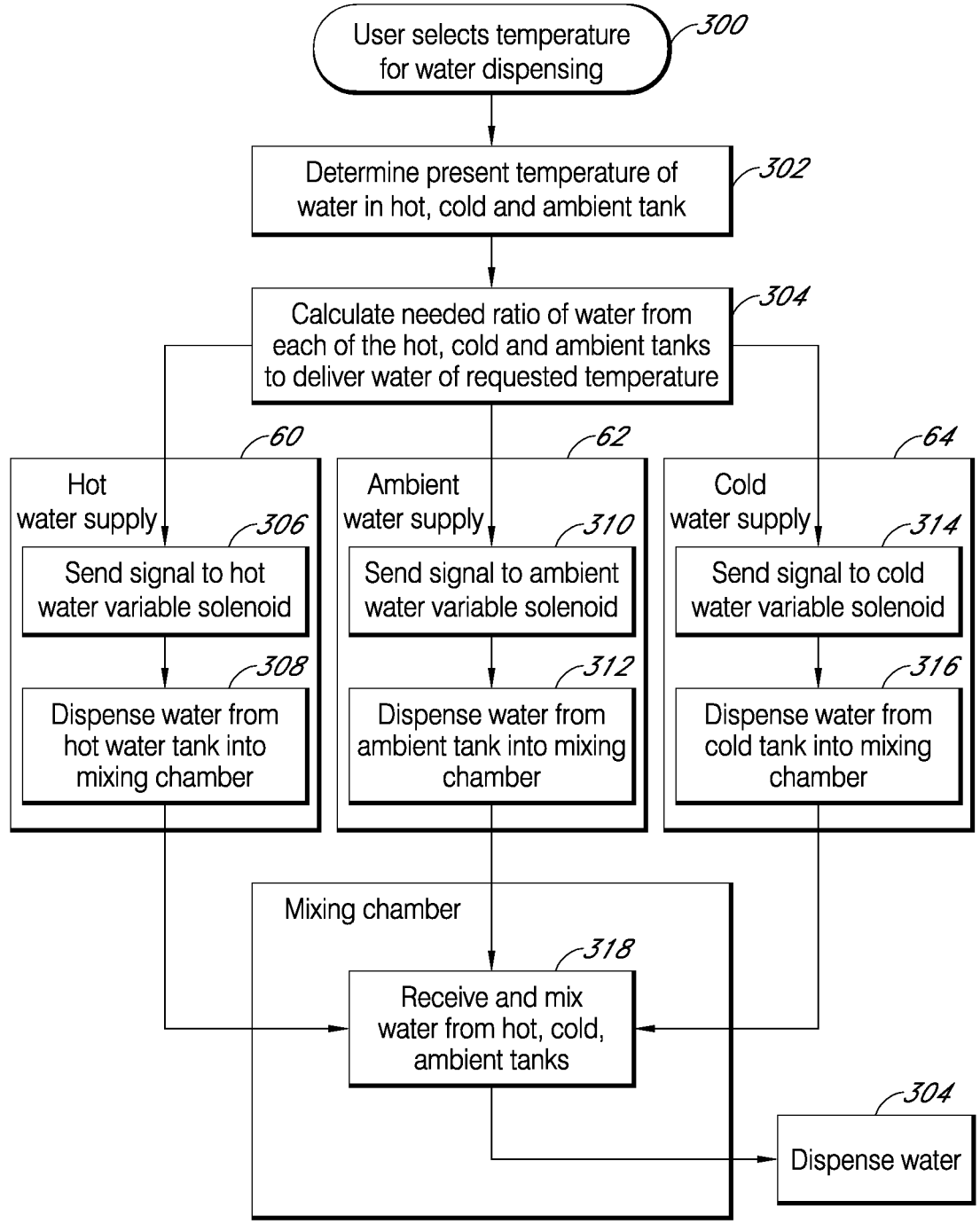
FIG. 8 is a flowchart illustrating an embodiment of a process of the present invention to mix water to a certain selected temperature.

FIGS. 3-5 illustrate an embodiment of a water dispenser 20 utilizing a variable temperature control assembly 30 of the present invention. Referring now to FIGS. 6-9, the process of how the variable temperature control assembly 30 of the present invention functions is illustrated and described. In FIG. 7, at step 200, the processor 130 of the water dispenser 20 continuously monitors the water level and temperature of the water 48 in the hot water tank 40, the ambient water tank 42 and the cold water tank 44. The processor 130 continuously monitors this information so the processor 130 knows at any given moment the temperatures in each water tank 40, 42, 44. The processor 130 uses that information, as explained below, to mix and deliver water 48 to the user at the precise temperature requested.

For the hot water tank 40, at step 202, the processor 130, using the water level sensors 82, 84, continuously checks to see if the water level of the water 78 in the hot water tank 40 is within pre-set high and low limits. If the water level of the water 78 is outside the pre-set limits, at step 206, the processor 130 adjusts the water level in the hot water tank 40 to bring it within pre-set high and low limits. At step 202, if the water level in the hot water tank 40 is within the pre-set limits, the processor 130 does nothing and does not adjust the water level. At step 204, the processor 130, using the water temperature sensor 80, continuously checks to see if the water temperature of the water 78 in the hot water tank 40 is below a pre-set lower limit. If it is below this pre-set lower limit, that means the water 78 is not hot enough and needs to be heated. The water 78 may get cool for a number of reasons, including the water 78 has been sitting for a while or users of the water dispenser 20 have dispensed water; lowering the water level in the hot water tank 40 and causing it to be filled with ambient water 48. At step 204, if the water temperature in the hot water tank 40 is above the pre-set lower limit, that means the water 78 is appropriately heated and does not need to be adjusted.

For the ambient water tank 42, at step 210, the processor 130, using the water level sensors 102, 104, continuously checks to see if the water level of the water 98 in the ambient water tank 42 is within pre-set high and low limits. If the water level of the water 98 is outside the pre-set limits, at step 210, the processor 130 adjusts the water level in the ambient water tank 42 to bring it within pre-set high and low limits. At step 210, if the water level in the ambient water tank 42 is within the pre-set limits, the processor 130 does nothing and does not adjust the water level. Further, for the cold water tank 44, at step 214, the processor 130, using the water level sensors 122, 124, continuously checks to see if the water level of the water 118 in the cold water tank 44 is within pre-set high and low limits. If the water level of the water 118 is outside the pre-set limits, at step 210, the processor 130 adjusts the water level in the cold water tank 44 to bring it within pre-set high and low limits. At step 214, if the water level in the cold water tank 44 is within the pre-set limits, the processor 130 does nothing and does not adjust the water level. At step 216, the processor 130, using the water temperature sensor 120, continuously checks to see if the water temperature of the water 118 in the cold water tank 44 is above a pre-set higher limit. If it is above this pre-set higher limit, that means the water 118 is not cool enough and needs to be cooled. The water 118 may get warm for a number of reasons, including the water 118 has been sitting for a while or users of the water dispenser 20 have dispensed water; lowering the water level in the cold water tank 44 and causing it to be filled with ambient water 48. At step 216, if the water temperature in the cold water tank 40 is below the pre-set higher limit, that means the water 118 is appropriately cooled and does not need to be adjusted.

Referring now to FIG. 7, in this embodiment, the user interface 22 includes a capacitive touch temperature slider 230 having a selector 232. The capacitive touch temperature slider 230 allows a user to choose from any mix of cold and hot water. If the user slides the selector 232 one end of the capacitive touch temperature slider 230, the water dispensed will be at the coldest temperature the water dispenser 20 can generate. If the user slides the selector 230 to the other end of the capacitive touch temperature slider 230, the water dispensed will be at the hottest temperature the water dispenser 20 can generate. If the user selects anywhere in the between the two ends of the of the capacitive touch temperature slider 230, the variable temperature control assembly 30 of the present invention will mix and dispense the water the temperature selected, as described in FIG. 8. Once the user selects a temperature that he wants the water to dispensed at using the selector 232 (Step 300), at step 302, the processor 130, which has been continually monitoring the water temperatures of the water tanks 40, 42, 44 using the water temperature sensors 80, 100, 120 determines the present temperature of each of the water tanks 40, 42, 44. At step 304, using the present temperature of the water in each water tank 40, 42, 44, the processor 130 calculates the ratio of water needed from each water tank 40, 42, 44 to deliver the water at the precise temperature the user selected with the selector 232 With the ratio calculated for each water tank 40, 42, 44, the processor 130 sends a signal simultaneously to the variable solenoid 72, 92, 112 associated with each water tank 40, 42, 44 (Steps 306, 310, 314). At steps 308, 312, 316, the variable solenoids 72, 92, 112 dispense the exact amount of water, signaled by the processor 130, from their respective water tanks 40, 42, 44 into the mixing chamber 24 (i.e. the hot water variable solenoid 72 dispenses the water 78 it was signaled to release from the hot water tank 40; the ambient water variable solenoid 92 dispenses the water 98 it was signaled to release from the ambient water tank 42; and the cold water variable solenoid 112 dispenses the water 118 it was signaled to release from the cold water tank 44.) At step 318, the mixing chamber 132 receives the water 78, 98, 118 from the variable solenoids 72, 92, 112 and the water 78, 98, 118 mixes water together to get the water to the temperature requested by the user. After mixing in the mixing chamber 132, at step 320, the mixed water is dispensed to the user through the water dispensing nozzle 24. By preparing, mixing and dispensing the water in this manner, no feedback sensor or feedback loop is needed to get the user water at the precise temperature requested.

Although certain embodiments and features of a variable temperature control assembly have been described herein, the scope of coverage of this patent is not limited thereto. On the contrary, this patent covers all embodiments of the teachings of the disclosure that fairly fall within the scope of permissible equivalents.

What is claimed is:

1. A variable temperature control assembly, for use in a water dispenser having a water dispensing nozzle through which an amount of water at a user-specified temperature is dispensed, comprising:

a variable temperature selector having a range of available temperatures for a user to select a specific temperature for the amount of water at a user-specified temperature to be dispensed through the water dispensing nozzle;

a hot water system in communication with the water dispensing nozzle, comprising a hot water tank, at least one hot water temperature sensor and a hot water solenoid, wherein the hot water solenoid is in communication with the hot water tank and, in use, the hot water tank holds a supply of hot water having a present temperature measured by the at least one hot water temperature sensor;

a cold water system in communication with the water dispensing nozzle, comprising a cold water tank, at least one cold water temperature sensor and a cold water solenoid, wherein the cold water solenoid is in communication with the cold water tank and, in use, the cold water tank holds a supply of cold water having a present temperature measured by the at least one cold water temperature sensor;

an ambient water system in communication with the water dispensing nozzle, comprising an ambient water tank, at least one ambient water temperature sensor and an ambient water solenoid, wherein the ambient water solenoid is in communication with the ambient water tank and, in use, the ambient water tank holds a supply of ambient water having a present temperature measured by the at least one ambient water temperature sensor;

a processor, in communication with the variable temperature selector, the at least one hot water temperature sensor, the hot water solenoid, the at least one cold water temperature sensor, the cold water solenoid, the at least one ambient water temperature sensor and the ambient water solenoid; capable of retrieving the present temperature of the hot water in the hot water tank from the at least one hot water temperature sensor, capable of retrieving the present temperature of the cold water in the cold water tank from the at least one cold water temperature sensor, capable of retrieving the present temperature of the ambient water in the ambient water tank from the at least one ambient water temperature sensor, capable of calculating a ratio of an amount of hot water from the hot water tank, an amount of cold water from the cold water tank and an amount of ambient water from the ambient water tank to be mixed together to produce the amount of water at a user-specified temperature at the specific temperature selected by the user and capable of simultaneously sending signals to the hot water solenoid to dispense the amount of hot water from the hot water tank, to the cold water solenoid to dispense the amount of cold water from the cold water tank and to the ambient water solenoid to dispense the amount of ambient water from the ambient water tank at the calculated ratio of the amount of hot water, to the amount of cold water, to the amount of ambient water needed to be mixed together to produce the amount of water at a user-specified temperature at the specific temperature selected by the user; and wherein, in use:

the user selects from the range of available temperatures on the variable temperature selector a temperature at which the amount of water at a user-specified temperature is to be dispensed through the water dispensing nozzle the user selected temperature is communicated to the processor;

the processor retrieves the present temperature of the hot water in the hot water tank from the at least one hot water temperature sensor, retrieves the present temperature of the cold water in the cold water tank from the at least one cold water temperature sensor and retrieves the present temperature of the ambient water in the ambient water tank from the at least one ambient water temperature sensor;

using the retrieved present temperatures of the hot water in the hot water tank, the cold water in the cold water tank and the ambient water in the ambient water tank, along with the user selected temperature, the processor calculates a ratio of an amount of hot water from the hot water tank, an amount of cold water from the cold water tank and an amount of ambient water from the ambient water tank to be mixed together to produce the amount of water at a user-specified temperature at the specific temperature selected by the user;

the processor simultaneously sends signals to the hot water solenoid to dispense the amount of hot water from the hot water tank, to the cold water solenoid to dispense the amount of cold water from the cold water tank and to the ambient water solenoid to dispense the amount of ambient water from the ambient water tank at the calculated ratio of the amount of hot water, to the amount of cold water, to the amount of ambient water needed to be mixed together to produce the amount of water at a user-specified temperature at the specific temperature selected by the user.

2. A variable temperature control assembly, for use in a water dispenser having a water dispensing nozzle through which an amount of water at a user-specified temperature is dispensed, comprising:

a variable temperature selector having a range of available temperatures for a user to select a specific temperature for the amount of water at a user-specified temperature to be dispensed through the water dispensing nozzle;

a hot water system in communication with the water dispensing nozzle, comprising a hot water tank, at least one hot water temperature sensor and a hot water solenoid, wherein the hot water solenoid is in communication with the hot water tank and, in use, the hot water tank holds a supply of hot water having a present temperature measured by the at least one hot water temperature sensor;

a cold water system in communication with the water dispensing nozzle, comprising a cold water tank, at least one cold water temperature sensor and a cold water solenoid, wherein the cold water solenoid is in communication with the cold water tank and, in use, the cold water tank holds a supply of cold water having a present temperature measured by the at least one cold water temperature sensor;

an ambient water system in communication with the water dispensing nozzle, comprising an ambient water tank, at least one ambient water temperature sensor and an ambient water solenoid, wherein the ambient water solenoid is in communication with the ambient water tank and, in use, the ambient water tank holds a supply of ambient water having a present temperature measured by the at least one ambient water temperature sensor;

a processor, in communication with the variable temperature selector, the at least one hot water temperature sensor, the hot water solenoid, the at least one cold water temperature sensor, the cold water solenoid, the at least one ambient water temperature sensor and the ambient water solenoid; capable of retrieving the present temperature of the hot water in the hot water tank from the at least one hot water temperature sensor, capable of retrieving the present temperature of the cold water in the cold water tank from the at least one cold water temperature sensor, capable of retrieving the present temperature of the ambient water in the ambient water tank from the at least one ambient water temperature sensor, capable of calculating a ratio of an amount of hot water from the hot water tank, an amount of cold water from the cold water tank and an amount of ambient water from the ambient water tank to be mixed together to produce the amount of water at a user-specified temperature at the specific temperature selected by the user and capable of simultaneously sending signals to the hot water solenoid to dispense the amount of hot water from the hot water tank, to the cold water solenoid to dispense the amount of cold water from the cold water tank and to the ambient water solenoid to dispense the amount of ambient water from the ambient water tank at the calculated ratio of the amount of hot water, to the amount of cold water, to the amount of ambient water needed to be mixed together to produce the amount of water at a user-specified temperature at the specific temperature selected by the user;

a mixing chamber in fluid communication with the hot water solenoid, the cold water solenoid and the ambient water solenoid; and wherein, in use:

the user selects from the range of available temperatures on the variable temperature selector a temperature at which the amount of water at a user-specified temperature is to be dispensed through the water dispensing nozzle the user selected temperature is communicated to the processor;

the processor retrieves the present temperature of the hot water in the hot water tank from the at least one hot water temperature sensor, retrieves the present temperature of the cold water in the cold water tank from the at least one cold water temperature sensor and retrieves the present temperature of the ambient water in the ambient water tank from the at least one ambient water temperature sensor;

using the retrieved present temperatures of the hot water in the hot water tank, the cold water in the cold water tank and the ambient water in the ambient water tank, along with the user selected temperature, the processor calculates a ratio of an amount of hot water from the hot water tank, an amount of cold water from the cold water tank and an amount of ambient water from the ambient water tank to be mixed together to produce the amount of water at a user-specified temperature at the specific temperature selected by the user;

the processor simultaneously sends signals to the hot water solenoid to dispense the amount of hot water from the hot water tank, to the cold water solenoid to dispense the amount of cold water from the cold water tank and to the ambient water solenoid to dispense the amount of ambient water from the ambient water tank at the calculated ratio of the amount of hot water, to the amount of cold water, to the amount of ambient water needed to be mixed together to the mixing chamber to produce the amount of water at a user-specified temperature at the specific temperature selected by the user.

3. The variable temperature control assembly of claim 2, wherein:

the hot water system further comprises a pump;
the cold water system further comprises a pump; and
the ambient water system further comprises a pump.

4. The variable temperature control assembly of claim 2, further comprising:

at least one low water level sensor disposed in the hot water tank;
at least one low water level sensor disposed in the cold water tank; and
at least one low water level sensor disposed in the ambient water tank.

5. The variable temperature control assembly of claim 2, further comprising:

at least one high water level sensor disposed in the hot water tank:
at least one high water level sensor disposed in the cold water tank; and
at least one high water level sensor disposed in the ambient water tank.

6. A method for delivering water at a specific requested temperature in a water dispenser, comprising the steps of:

providing a water dispenser, having:
a water dispensing nozzle;
a variable temperature selector having a range of available temperatures for a user to select a specific temperature for the amount of water at a user-specified temperature to be dispensed through the water dispensing nozzle;
a hot water system in communication with the water dispensing nozzle, comprising a hot water tank, at least one hot water temperature sensor and a hot water solenoid, wherein the hot water solenoid is in communication with the hot water tank and, in use, the hot water tank holds a supply of hot water having a present temperature measured by the at least one hot water temperature sensor;
a cold water system in communication with the water dispensing nozzle, comprising a cold water tank, at least one cold water temperature sensor and a cold water solenoid, wherein the cold water solenoid is in communication with the cold water tank and, in use, the cold water tank holds a supply of cold water having a present temperature measured by the at least one cold water temperature sensor;
an ambient water system in communication with the water dispensing nozzle, comprising an ambient water tank, at least one ambient water temperature sensor and an ambient water solenoid, wherein the ambient water solenoid is in communication with the ambient water tank and, in use, the ambient water tank holds a supply of ambient water having a present temperature measured by the at least one ambient water temperature sensor;
a processor, in communication with the variable temperature selector, the at least one hot water temperature sensor, the hot water solenoid, the at least one cold water temperature sensor, the cold water solenoid, the at least one ambient water temperature sensor and the ambient water solenoid; capable of retrieving the present temperature of the hot water in the hot water tank from the at least one hot water temperature sensor, capable of retrieving the present temperature of the cold water in the cold water tank from the at least one cold water temperature sensor, capable of retrieving the present temperature of the ambient water in the ambient water tank from the at least one ambient water temperature sensor, capable of calculating a ratio of an amount of hot water from the hot water tank, an amount of cold water from the cold water tank and an amount of ambient water from the ambient water tank needed to be mixed together to produce the amount of water at a user-specified temperature at the specific temperature selected by the user and capable of simultaneously sending signals to the hot water solenoid to dispense the amount of hot water from the hot water tank, to the cold water solenoid to dispense the amount of cold water from the cold water tank and to the ambient water solenoid to dispense the amount of ambient water from the ambient water tank at the calculated ratio of the amount of hot water, to the amount of cold water, to the amount of ambient water needed to be mixed together to produce the amount of water at a user-specified temperature at the specific temperature selected by the user;

selecting from the range of available temperatures on the variable temperature selector a temperature at which the amount of water at a user-specified temperature is to be dispensed through the water dispensing nozzle;

retrieving the present temperature of the hot water in the hot water tank from the at least one hot water temperature sensor, retrieving the present temperature of the cold water in the cold water tank from the at least one cold water temperature sensor and retrieving the present temperature of the ambient water in the ambient water tank from the at least one ambient water temperature sensor;

using the retrieved present temperatures of the hot water in the hot water tank, the cold water in the cold water tank and the ambient water in the ambient water tank, along with the user selected temperature, calculating a ratio of an amount of hot water from the hot water tank, an amount of cold water from the cold water tank and an amount of ambient water from the ambient water tank needed to be mixed together to produce the amount of water at a user-specified temperature at the specific temperature selected by the user;

simultaneously sending signals to the hot water solenoid to dispense the amount of hot water from the hot water tank, to the cold water solenoid to dispense the amount of cold water from the cold water tank and to the ambient water solenoid to dispense the amount of ambient water from the ambient water tank at the calculated ratio of the amount of hot water, to the amount of cold water, to the amount of ambient water needed to be mixed together to produce the amount of water at a user-specified temperature at the specific temperature selected by the user;

mixing together the dispensed amount of hot water from the hot water tank, the dispensed amount of cold water from the cold water tank and the dispensed amount of ambient water from the ambient water tank to produce the amount of water at a user-specified temperature at the specific temperature selected; and dispensing the produced amount of water at a user-specified temperature at the specific temperature selected through the water dispensing nozzle.

7. The method for delivering water at a specific requested temperature in a water dispenser of claim 6, further comprising the step of providing a mixing chamber in communication with the hot water solenoid, the cold water solenoid and the ambient water solenoid; wherein, at the step of mixing, the dispensed amount of hot water from the hot water tank, the dispensed amount of cold water from the cold water tank and the dispensed amount of ambient water from the ambient water tank are mixed together in the mixing chamber to produce the amount of water at a user-specified temperature at the specific temperature selected.

8. The method for delivering water at a specific requested temperature in a water dispenser of claim 6, wherein the provided hot water system further comprises a pump, the provided cold water system further comprises a pump and the provided ambient water system further comprises a pump.

9. The method for delivering water at a specific requested temperature in a water dispenser of claim 6, further comprising the steps of:

providing a pre-set temperature lower limit for the supply of hot water in the hot water tank;

continuously monitoring the temperature of the supply of hot water in the hot water tank;

if the temperature of the supply of hot water in the hot water tank is below the pre-set temperature lower limit for the supply of hot water in the hot water tank, heating the supply of hot water in the water tank until the temperature of the supply of hot water in the hot water tank is above the pre-set temperature lower limit;

providing a pre-set temperature upper limit for the supply of cold water in the cold water tank;

continuously monitoring the temperature of the supply of cold water in the cold water tank; and if the temperature of the supply of cold water in the cold water tank is above the pre-set temperature upper limit for the supply of cold water in the cold water tank, chilling the supply of cold water in the cold water tank until the temperature of the supply of cold water in the cold water tank is below the pre-set temperature upper limit.

10. The method for delivering water at a specific requested temperature in a water dispenser of claim 6, further comprising the step of providing at least one low water level sensor disposed in the hot water tank and at least one low water level sensor disposed in the cold water tank.

11. The method for delivering water at a specific requested temperature in a water dispenser of claim 6, further comprising the step of providing at least one high water level sensor disposed in the hot water tank and at least one high water level sensor disposed in the cold water tank.

* * * * *